United States Patent

Pole

[15] 3,654,389

[45] Apr. 4, 1972

[54] COORDINATE INPUT DEVICE

[72] Inventor: Robert V. Pole, Yorktown Heights, N.Y.

[73] Assignee: International Business Machines Corporation, Armonk, N.Y.

[22] Filed: July 12, 1968

[21] Appl. No.: 744,511

[52] U.S. Cl. ....... 178/18, 350/160 P

[51] Int. Cl. ....... G08c 21/00

[58] Field of Search ....... 178/18, 19, 7.6; 340/324.1; 250/71, 83.3 VV, 199, 220; 350/160 P

[56] References Cited

UNITED STATES PATENTS 3,328,523 6/1967 Treseder et al. ....... 178/7.6

3,400,214 9/1968 Hamann ....... 178/7.87

*Primary Examiner*—Kathleen H. Claffy

*Assistant Examiner*—Thomas L. Kundert

*Attorney*—Sughrue, Rothwell, Mion, Zinn & Macpeak

[57] ABSTRACT

A coordinate input device having two beams of pulsed laser light passing through a photochromic glass plate. The successive intersection points of pulses from the two beams scan the plate along a raster to successively mark each coordinate position on the plate. A light pen directs ultraviolet light onto the surface of the plate to generate a scattering center at any chosen coordinate on the plate. Laser light is scattered by such centers and is detected by the light pen. The greater amount of light scattered at an intersection point is used to generate an indication of the chosen coordinate. Another embodiment uses roughened glass, rather than photochromic glass, to cause scattering.

8 Claims, 4 Drawing Figures

INVENTOR
ROBERT V. POLE

BY Sughrue, Rothwell, Mion, Zinn & Macpeak
ATTORNEYS

COORDINATE INPUT DEVICE

BACKGROUND OF THE INVENTION

1. Field of the Invention

This invention relates to a coordinate input device using laser beams for coordinate scanning and using a light pen for selecting and sensing a coordinate position. More particularly, the invention relates to such a device in which the intersection point of two laser beam wave fronts is used to scan the coordinate position.

2. Description of the Prior Art

Stylus-and-tablet input systems have been used in the prior art. One such prior art device is the RAND tablet which uses two layers of fine orthogonal grids to determine the coordinate position of an input signal. Because grids are needed in such prior art systems, they are limited in the resolution and size.

SUMMARY OF THE INVENTION

The invention relates to an improved coordinate input device using the intersection point of the wave fronts from two pulsed light beams to mark a coordinate position on a transparent plate, thereby allowing accurate measurement of a coordinate position with high resolution. Each of the wave fronts is one of a train of wave fronts produced by a train of short pulses of parallel beam coherent light from a laser source. Two such trains of short pulses are generated in order to provide two trains of preferably orthogonally intersecting wave fronts. Scanning of the plate is provided by using slightly different pulse repetition rates for the two trains of pulses. Readout of coordinate positions is preferably accomplished by using photochromic glass for the transparent plate, and by selectively producing scattering regions in the photochromic glass. These scattering regions are produced by light, preferably ultra-violet light, from a light pen positioned over the plate. A scattering region causes light, preferably infrared light, from the wave fronts to be directed toward a sensor element in the light pen. The increased infrared light scattered at points of intersection of wave fronts is non-linearly detected by the sensor element to determine the instant in time when a wave front intersection point passes a scattering region. A comparison of the time at which high intensity light from an intersection point is measured, by comparison with the known times at which intersections should occur at various coordinate points, allows a determination of the coordinate position of the light pen.

Unlike the prior art devices, the size of this coordinate input device can be easily made quite large by simply using a large plate of glass and suitably adjusting the laser beam pulse repetition frequencies. The resolution of this device perpendicular to the scanning lines can be made as fine as desired, to the limit of the maintainable difference in laser pulse repetition frequencies. The resolution along the scanning lines is a function of the width of the pulses, which can be made very narrow.

DESCRIPTION OF THE PREFERRED EMBODIMENTS

Figure 1:
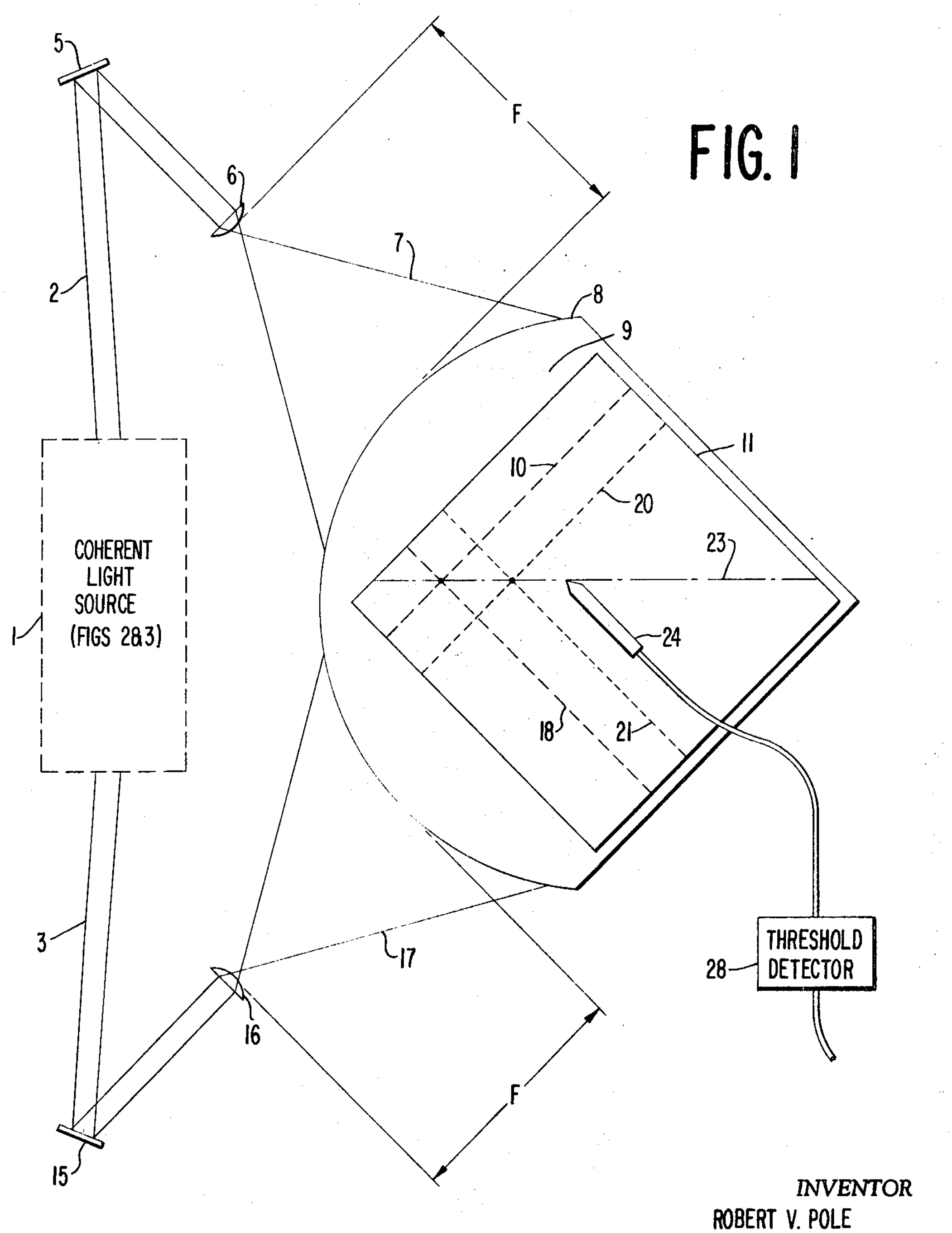
FIG. 1 is an overall diagram of a coordinate input device according to the present invention.
Figure 2:
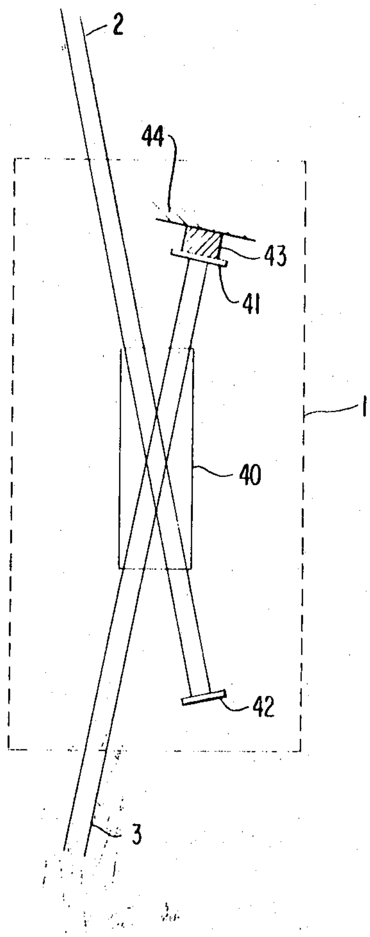
FIG. 2 is a diagram of a bidirectional laser, usable as a coherent light source in FIG. 1.
Figure 3:
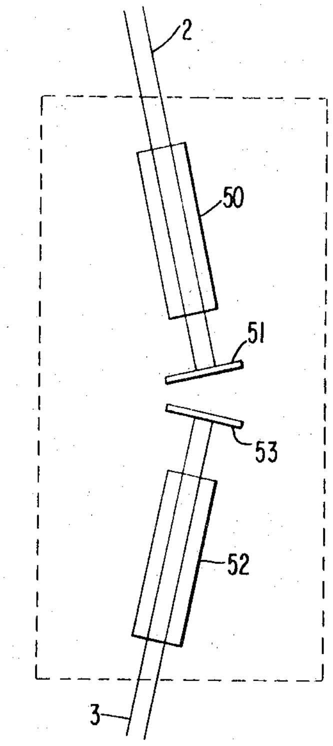
FIG. 3 is a diagram of a pair of lasers usable as a coherent light source in FIG. 1.

In FIG. 1, a coherent light source 1, described more fully in connection with FIGS. 2 and 3, generates a first train of pulses of coherent light in a beam 2 and a second train of pulses of coherent light in a beam 3. Beam 2 is reflected by a mirror 5 through a cylindrical lens 6 to form a divergent beam 7. Divergent beam 7 strikes a circular edge 8 of a plate of glass 9. The nearest point on circular edge 8 from cylindrical lens 6 is a distance F from the lens.

If the radius of curvature of edge 8 is r and the index of refraction of the glass is $n$, then $F = nr/n{-}1$. If the dimensions of the system meet the condition of this equation, the circular wave fronts of the pulses of light from lens 6 will be converted to form straight line wave fronts through the plate of glass. One such straight line wave front is illustrated by broken line 10. The rectangular area 11 marked on the plate of glass 9 is the area used for the tablet. Areas other than rectangular areas could be used, and the rectangular area has been shown for ease of illustration only.

In the same manner as has been described in connection with beam 2, beam 3 is reflected by mirror 15 through cylindrical lens 16 to form a divergent beam 17. Divergent beam 17 also strikes edge 8 of plate 9 to form straight line wave fronts, one of which is illustrated by broken line 18. Wave fronts 10 and 18 are shown as existing in one instant of time. After a brief interval of time, wave front 10 will have advanced to the position marked by dotted line 20. It can be seen that all of the intersection points of these two wave fronts at successive instants of time fall along line 23.

Because the two trains of pulses have slightly different pulse repetition frequencies, the next pair of orthogonal wave fronts will have their mutual intersection points along another horizontal line parallel to line 23, but spaced a short distance from line 23. The next succeeding pair of wave fronts will do the same thing, and so on. Consequently, by the proper adjustment of the two pulse repetition rates, the intersection points of the orthogonal wave fronts can be made to scan the entire glass plate at a raster which can be as fine as it is possible to adjust the difference in frequencies of the pulse repetition rates.

In the preferred embodiment, glass plate 9 is photochromic glass which is insensitive to the wave length of the scanning pulses from the laser, which may be, for example, infrared, but which generates scattering (and absorption) centers under the influence of light of a different wave length, for example, light in the ultra-violet waveband. Such photochromic glass is commercially available from a number of sources, including Corning and Owens-Illinois. If a particular point on such a photochromic glass plate is illuminated by ultra-violet light, this point will cause scattering of the infrared laser light out of the plate whenever a wave front of infrared laser light passes through it. The point will scatter twice as much infrared laser light when an intersection point of two wave fronts passes through it.

For use of this system as an input tablet, a light pen 24 is used which contains a source of ultraviolet light and a non-linear detector sensitive to infrared radiation. The infrared detector is non-linear in order to be able to sense the greater amount of light from a wave front intersection, while being insensitive to the amount of light produced by the passage of a single wave front. Such a light pen is described more fully in connection with FIG. 4.

FIG. 2 illustrates a bidirectional laser usable in block 1 of FIG. 1. Element 40 is a laser element, which may be of the YA1G:Nd type, which is well known in the prior art. Two mirror elements 41 and 42 are used to form two cavities in connection with the laser element. One of the two cavities is tunable in length by slight movement of the mirror element. For example, mirror 41 may be placed on a piezo-electric element, which has a length controllable by an applied electric field. The piezo-electric element 43 is placed against a fixed surface 44 to provide a means for moving mirror 41.

It is known that a laser may be caused to emit ultra-short pulses at a variable repetition frequency by internal modulation of the laser. This technique is well described in "Generation of Ultra-Short Optical Pulses by Mode Locking the YA1G:Nd Laser", DiDomenico et al., *Applied Physics Letters*, Volume 8, Number 7, Apr. 1, 1966, pages 180 through 183.

The article cited is incorporated by reference into this specification.

In the laser system of FIG. 2, both cavities are mode-locked by separate modulators which can be either piezo-electric or electro-optic. By slight variations in the position of mirror 41, the two cavities can be caused to generate light pulses at different pulse repetition frequencies. The difference between the pulse repetition frequencies is a function of the field applied to piezo-electric crystal 43.

FIG. 3 illustrates another embodiment of the coherent light source 1, used in FIG. 1. In this embodiment, two independent mode-locked lasers are used to provide the two trains of optical pulses. A first laser including laser element 50 and mirror 51 emits beam 2, as previously described. A second laser including laser element 52 and mirror 53 emits beam 3, as previously described. One of these mirrors 51 and 53 is tunable by use of a piezo-electric element similar to element 43 used in FIG. 2. Thus, the pulse repetition frequency of one of the lasers can be varied.

The amount of difference desired between the two pulse repetition frequencies is a function of the fineness of the raster desired on the plate. The less difference there is between the two pulse repetition frequencies, the finer the raster will be. A finer raster, of course, has more lines per unit length, and consequently greater resolution. However, as the raster is made finer, the number of frames per unit time decreases. However, there is no presently anticipated system which seems capable of using any combination resolution and frame rate beyond the high inherent limits of the system disclosed.

Figure 4:
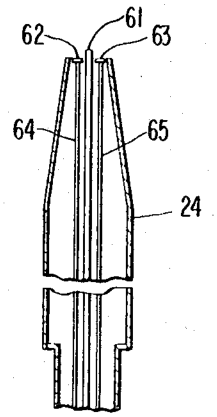
FIG. 4 is a cross-sectional diagram of a light pen usable with the invention.

FIG. 4 is a cross-sectional representation of the light pen 24, as shown in FIG. 1. An optical fiber 60 receives ultra-violet light from some light source (not illustrated) and directs this light to a fine point at its tip 61. The tip of the light pen is placed adjacent to the photochromic plate 9, as illustrated in FIG. 1, to generate scattering centers under the influence of the ultra-violet light. Light sensors 62 and 63 are selected to be sensitive to infrared light, but to be insensitive to ultra-violet light. One or more such sensors may be used, but two are illustrated. When infrared light is scattered by a scattering center within the photochromic glass plate 9, this light causes photosensitive elements 62 and 63 to generate electrical signals, which are carried by lines 64 and 65 out of the pen to some utilization device (not illustrated).

Lines 64 and 65 may be connected to some threshold device, such as element 28 in FIG. 1, which passes an output signal when the input signal is above some predetermined lower limit. This lower limit is above the value of current caused by the passage of a single wave front, but is below the value of electric signal caused by the passage of an intersection point between two wave fronts.

The non-linearity of the detector may be achieved electrically, by the threshold device as just described, or it may be achieved by optical means. The photosensitive elements 62 and 63 may be covered by an optically non-linear element such as a bleachable dye. Such an optically non-linear element will cause a limitation of the output signal for small values of signal, but will allow passage of large signals unobstructed.

In FIG. 1, if the glass plate 9 is made of glass with a roughened surface, a small part of the light from each of the passing wave fronts will be emitted from the surface of the glass as the wave passes. A greater amount of light will be emitted as an intersection point between two wave front passes. Thus, it is possible to use a light pen which only receives the light from the wave front, without, itself emitting ultra-violet light. However, this is not the preferred embodiment. Although implementation of the roughened-glass system is somewhat simpler, the noise levels may be increased somewhat, and the accuracy of the system somewhat reduced.

Ordinarily in the use of this invention, the response of the light-pen detector must be fast. However, a low response detector can be employed if correlation techniques are used. Since the device uses very closely spaced scan (i.e. intersection) lines, a detected spot may encompass several hundred lines, allowing the individual pulse intersections to be correlated to produce a single pulse peak. Such a correlation technique reduces considerably the need for a very fast detector system.

The photochromic glass used in this system must be so chosen as to recover at a rate faster than the rate at which the data can be entered with the light pen, which is the frame rate of the system.

It is possible to provide a reference for a draftsman, by providing an ultra-violet sensitive paper roll on the back of the glass plate, which will be sensitive to ultra-violet light from the light pen.

Although the wave fronts have been shown as orthogonally intersecting, this is not necessarily the case. Intersections other than orthogonal intersections could be used. However, because most work is done in orthogonal coordinate systems, the preferred embodiment has shown the use of orthogonally intersecting wave fronts.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A coordinate input device comprising:
   a. a plate relatively thin in one dimension and having another two dimensions for defining coordinate points on the surface of said plate,
   b. first means for propagating a first train of short pulses of parallel beam coherent light at a first repetition rate through said plate along one of said two dimensions,
   c. second means for propagating a second train of short pulses of parallel beam coherent light at a second repetition rate through said plate along the other of said two dimensions, and
   d. detector means adapted to be located at any coordinate point along said surface for detecting light from said surface caused by said first and second trains and for generating an output pulse when located over a point of intersection of a pulse from said first train and a pulse from said second train.

2. A system according to claim 1 wherein said plate is constructed of photochromic material.

3. A system according to claim 2 wherein said photochromic material is photochromic glass.

4. A system according to claim 2 wherein said detector means further comprises:
   a. means for directing light in a first wave band onto said plate,
   b. means for receiving light in a second wave band from said plate, and
   c. means for generating said output pulse when said light in a second wave band is above a predetermined intensity, wherein said predetermined intensity is above the intensity of light resulting from the interaction of said light in a first wave band with light from only one of said first and second trains and is below the intensity resulting from the interaction of said light in a first wave band with light from both of said first and second trains.

5. A system according to claim 1 further comprising:
   a. laser means having first and second resonant cavities,
   b. said first cavity generating said first train of pulses at said first repetition rate,
   c. said second cavity generating said second train of pulses at said second repetition rate,
   d. said first means comprising an optical system for receiving and propagating pulses from said first cavity, and
   e. said second means comprising an optical system for receiving and propagating pulses from said second cavity.

6. A system according to claim 5 wherein said laser means comprises a bidirectional laser having two cavities.

7. A system according to claim 5 wherein said laser means further comprises:
   a. a first laser having said first resonant cavity, and b. a second laser having said second resonant cavity.

8. A system according to claim 1 wherein said surface is roughened, whereby partial scattering of said light pulses occurs at said roughened surface.

* * * * *